July 24, 1934.    G. W. BILL    1,967,605

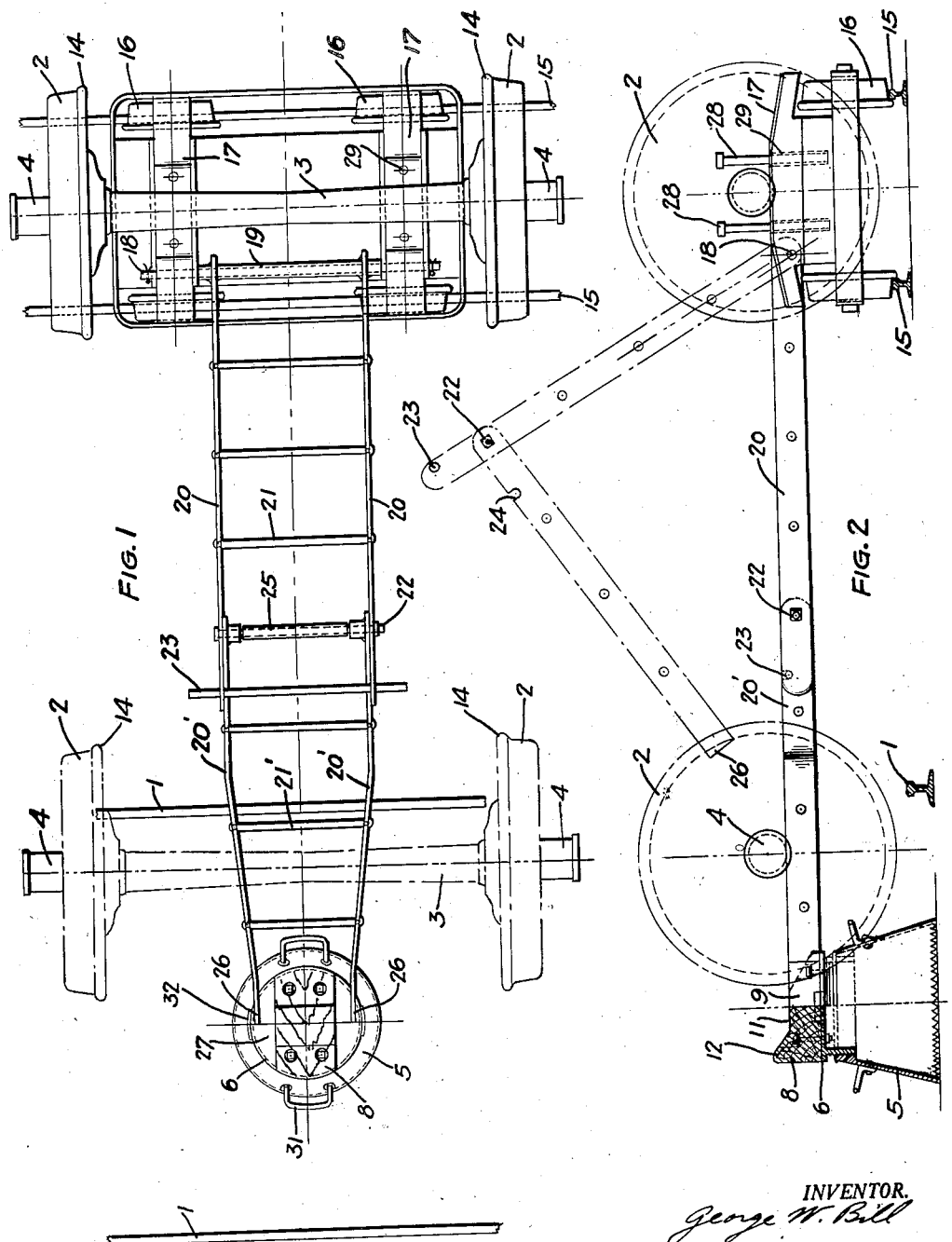
July 24, 1934. G. W. BILL 1,967,605
WHEEL HANDLING DEVICE
Filed Feb. 21, 1931   2 Sheets-Sheet 1
INVENTOR.
George W. Bill
BY
Gifford, Scull & Burgess
ATTORNEYS.

WHEEL HANDLING DEVICE

Filed Feb. 21, 1931    2 Sheets-Sheet 2

INVENTOR.
George W. Bill
BY
Gifford, Scull & Burgess
ATTORNEYS.

Patented July 24, 1934

1,967,605

UNITED STATES PATENT OFFICE 1,967,605

WHEEL HANDLING DEVICE

George W. Bill, Valparaiso, Ind., assignor to Union Tank Car Company, Chicago, Ill., a corporation of New Jersey Application February 21, 1931, Serial No. 517,442

5 Claims. (Cl. 214—85)

This invention relates to a novel and improved device for handling wheels, and will be best understood from the following description and the annexed drawings, in which I have shown a selected embodiment of the invention, and in which:

Fig. 1 is a plan view of the device in use;

Fig. 2 is an elevation of the same device shown in Fig. 1, parts being shown in section;

Referring first to Figs. 1 and 2, I have shown the complete device therein as used in transferring wheels from a shop repair track to a storage track. The shop repair track is of the usual kind, the two rails of which are shown at 1, and is of standard gauge. The wheels are connected in pairs as is usual and, as indicated in Fig. 1, the two wheels 2 are secured to a common axle 3, and also have the usual journals 4. The two wheels and associated axle will hereinafter be referred to, for sake of convenience, as a pair of wheels.

Figure 4:
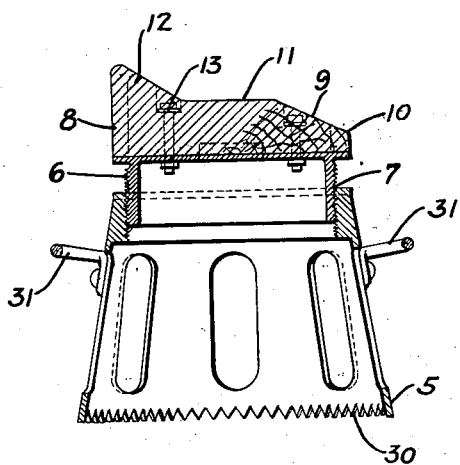
Fig. 4 is a section on the line 4—4 of Fig. 3.

When it is desired to remove a pair of wheels from the shop repair track, for example, I place between the rails 1 a turntable comprising a base 5 and a head 6 having threaded engagement with the base, as best shown in Fig. 4, and as indicated at 7. Disposed on the head is a block 8 having an inclined portion 9, the lowest point 10 of which is at such a height that it will come beneath an axle of a pair of wheels which are rested on the rails 1.

By the threaded engagement between the head and the base, the head and block carried thereby may be adjusted to various heights for different diameters of axles and for different sizes of wheels. When the portion 9 is placed beneath an axle, the pair of wheels may then be rolled upwardly on the block until the axle rests upon the horizontally inclined portion 11 of the block, a suitable stop 12 being provided to limit movement of the axle. In the form shown, the block is shown as of wood secured to the head 6 by means of bolts 13.

After the axle has been rolled onto the upper portion 11 of the block as described above, the wheels will be lifted from the rails, and the height of the portion 11 is such that the flanges 14 of the wheels will now clear the rails 1. The head may then be turned to bring the pair of wheels into position substantially parallel to the rails 1.

Disposed adjacent the shop repair track, and shown as parallel thereto, is a second track, the rails of which are indicated at 15, and it will be noted that this track is shown as a narrow gauge one. On this track is mounted a truck having wheels 16 resting on the rails 15 and supporting a frame of any suitable construction, here shown as comprising two bearing members 17, each of which is shown as having a central substantially horizontal portion, on either side of which is an inclined portion. These bearing members extend transversely of the truck as shown, and are adapted to support the axle 3 of a pair of wheels, as plainly shown.

Pivotally mounted on the frame of the truck, as at 18, is a laterally extending arm of such length that its other end is adapted to rest upon the head 6 of the turntable. In the form shown, the pivot 18 is in the form of a rod extending lengthwise of the truck frame, and the arm has a bearing 19 surrounding this rod. Secured to the bearing are laterally extending side members 20 connected by suitable spacers 21.

Preferably, the arm is formed of a plurality of sections hinged together, and, in the form shown, there are two sections hinged together at 22. The members 20 extend beyond the pivot or hinge 22, and when the arm is in operative position, as shown in full lines in Fig. 2, a transversely extending rod 23 carried by the members 20 is received in notches 24 in the upper edges of corresponding members 20'.

These members 20' are of similar construction to the members 20, and have their ends nearest the truck mounted on the pivot 22. This pivot is here shown as in the form of a long bolt extending between the members 20 and surrounded between the members 20 by a sleeve 25 which may be used as a convenient handle when collapsing or expanding the arm.

The members 20' are equipped with spacers 21', and have their outer ends 26 spaced apart a distance such that they will be received on the portions 27 of the head 6 which lie on opposite sides of the block 8.

With the above arrangement, after the pair of wheels has been lifted onto the turntable, and the turntable head has been rotated so as to bring the axle substantially parallel to the rails of the shop repair track, the narrow gauge truck may be brought to a position opposite the turntable and the arm expanded until its ends rest upon the turntable head. The pair of wheels may then be rolled along the arm, which thus forms a bridge to convey the wheels to the truck. When in place on the truck, removable stops may be employed to hold the wheels thereon, these stops being exemplified by removable bolts 28 received in holes 29 in the frame.

It will be understood that the height of the members 20, and particularly the members 20', where they rest upon the head, is substantially equal to the height of the portion 11 of the block above the head 6, so that the axle will roll without difficulty from the block to the bridge formed by the arm.

Similarly, it will be understood that the pivot 18 is so arranged with respect to the height of the members 20 that the axle will roll from the members 20 onto the middle portion of the bearing members 17. At the same time, inequality due to different elevations of the two tracks may be easily compensated for by adjustment of the arm about the pivot 18, or, if necessary, by a slight adjustment between sections of the arm about the pivot 22, although ordinarily such adjustment will not be necessary.

While the truck is shown as being mounted on a track as will be usual, it is, of course, to be understood that the truck may be of a type not needing a track, without departing from the scope of this invention.

Figure 3:
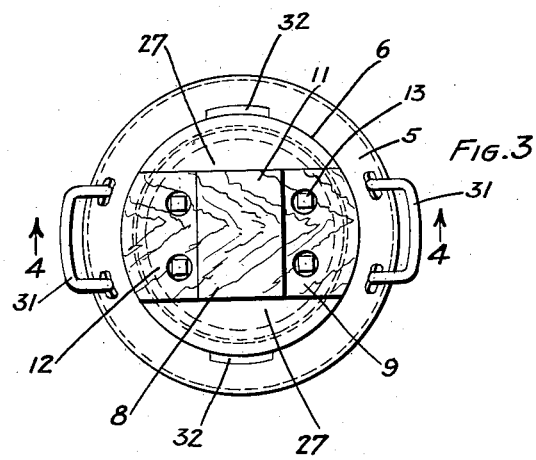
Fig. 3 is a plan view of the turntable forming a part of the device.
Figure 5:
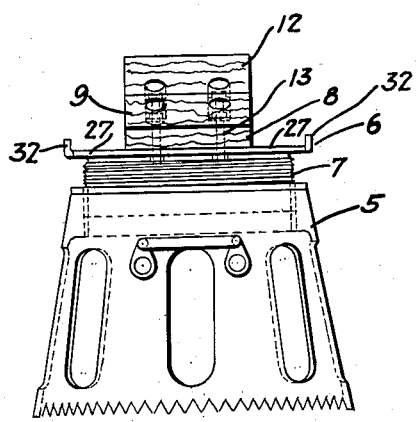
Fig. 5 is an elevation of the turntable as viewed from the right of Fig. 4.

Referring more particularly to Figs. 3, 4 and 5, wherein I have shown the turntable on an enlarged scale, it will be seen that the bottom of the base 5 is provided with a plurality of serrations 30 whereby rotation of the base is prevented, it being understood that these serrations will bite into the ties of the track and/or the ballast between the ties to a sufficient extent to prevent rotation.

The base is also provided with suitable handles 31 whereby the turntable may be easily placed in position, and removed when not in use. On the head 6 of the periphery thereof, outside the portions 27, are disposed upwardly extending projections 32 which serve to prevent accidental displacement of the ends 26 of the members 20'.

From the above it will be seen that I have provided a device for rapidly and efficiently transferring pairs of wheels to and from a storage track. While the operation has been described in connection with transferring the wheels from the shop repair track to the truck and thence to storage track, nevertheless it is to be understood that the operation may be reversed and that the device is intended for use in transferring wheels under any circumstances where found applicable.

While I have shown and described the invention as embodied in a certain form, it is to be understood that changes may be made therein without departing from the scope of the invention.

I claim:

1. A turntable having a base adapted to be placed between the rails of a track, a block supported on said base and adapted to engage beneath an axle of a pair of wheels on the rails, a head supporting said block and rotatably mounted on the base, means to raise and lower the head, and means on opposite sides of the head to support members with their tops substantially level with the top of the block, whereby said axle may be transferred to said members.

2. A turntable having a base adapted to be placed between the rails of a track, a block supported on said base and rotatable thereon and adapted to engage beneath an axle of a pair of wheels on the rails, means to raise and lower said block, said block having a horizontally inclined portion upon which an axle may be rolled, and a higher portion connecting with the inclined portion to receive the axle.

3. A turntable having a base adapted to be placed between the rails of a track, a block supported on said base and rotatable thereon and adapted to engage beneath an axle of a pair of wheels on the rails, means to raise and lower said block, said block having a horizontally inclined portion upon which an axle may be rolled, and a higher portion connecting with the inclined portion to receive the axle, and a stop to limit movement of the axle along said higher portion.

4. A truck comprising a support for a pair of wheels adapted to engage the axle connecting said wheels, with said axle extending lengthwise of the truck, and an arm extending laterally from said support and adapted to support said axle when rolled to or from the trucks, said arm being formed in a plurality of sections hinged together, with one section pivoted to the support and having its axle-engaging surface substantially flush with the axle-engaging surface of the support.

5. In combination, a truck having thereon a support for a pair of wheels adapted to engage the axle connecting said wheels, with said axle extending lengthwise of the truck, a turntable adapted to be placed between the rails of a track, a block on said turntable adapted to engage said axle, means on the block adapted to lift a pair of wheels after engagement of said block with the axle of said wheels, an arm having one end pivotally secured to said truck and having an axle-engaging surface substantially flush with the axle-engaging surface of said support, and means on said turntable to support the other end of said arm with the axle-engaging surface thereof substantially flush with the top of said block.

GEORGE W. BILL.